(12) United States Patent
Fujita

(10) Patent No.: US 6,389,192 B1
(45) Date of Patent: May 14, 2002

(54) LIGHT SOURCE WITH WDM FUNCTION, AND OPTICAL AMPLIFIER AND TWO-WAY OPTICAL TRANSMISSION APPARATUS APPLIED THEREWITH

(75) Inventor: Masayuki Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/256,315

(22) Filed: Feb. 24, 1999

(30) Foreign Application Priority Data

Feb. 26, 1998 (JP) .......................................... 10-045469

(51) Int. Cl.$^7$ ................................................. G02B 6/28
(52) U.S. Cl. ............................ 385/24; 385/47; 359/127
(58) Field of Search ........................ 385/15, 24, 31–33, 385/39, 47; 359/113–115, 118, 119, 124, 127, 131, 154

(56) References Cited

U.S. PATENT DOCUMENTS

| | | | |
|---|---|---|---|
| 4,479,697 A | | 10/1984 | Kapany et al. |
| 4,880,289 A | * | 11/1989 | Imoto et al. ................ 359/131 |
| 5,272,555 A | * | 12/1993 | Suzuki ....................... 359/113 |
| 5,361,161 A | * | 11/1994 | Baney et al. ................ 359/337 |
| 5,588,078 A | * | 12/1996 | Cheng et al. ................. 385/33 |
| 5,594,821 A | * | 1/1997 | Cheng .......................... 385/24 |
| 5,659,644 A | | 8/1997 | DiGiovanni et al. |
| 5,680,237 A | * | 10/1997 | Cheng ........................ 359/131 |
| 5,917,626 A | * | 6/1999 | Lee ............................ 359/131 |

FOREIGN PATENT DOCUMENTS

| | | |
|---|---|---|
| EP | 0 050 555 A1 | 4/1982 |
| EP | 0 444 694 A2 | 9/1991 |
| JP | 1-109311 * | 4/1989 |
| JP | 8-271760 | 10/1996 |
| JP | 10-32547 | 2/1998 |
| JP | 10-48459 | 2/1998 |

OTHER PUBLICATIONS

Japanese Office Action dated Sep. 21, 1999, with partial translation.
European Search Report dated Feb. 8, 2001.

* cited by examiner

Primary Examiner—Akm E. Ullah
Assistant Examiner—Michelle R. Connelly-Cushwa
(74) Attorney, Agent, or Firm—McGinn & Gibb, PLLC

(57) ABSTRACT

A light source device comprises a light source for outputting a light having the first wavelength; a first lens for converting the light into a collimated beam; an optical output unit for outputting a light having the second wavelength; a second lens for converting the light into a collimated beam; and an optical filter, provided between said first lens and the second lens, for passing the light having the first wavelength and reflecting the light having the second wavelength. The optical input unit receives the lights having the first and the second wavelengths collected by the second lens, and outputs a light wavelength-multiplexed through the optical input unit. An optical amplifier is designed by directly connecting a rare earth doped optical fiber to the output side on which a wavelength-multiplexed light of the light source device is output. A wavelength-multiplexed light source can be also designed by serially connecting plural stages of light source devices. In the optical fiber amplifier, a loss generated between a pump light source and a rare earth doped optical fiber can be reduced, and the reduction of a gain can be prevented. Thus, the entire system including the optical fiber amplifier can be much smaller.

7 Claims, 6 Drawing Sheets

LIGHT SOURCE WITH WDM FUNCTION, AND OPTICAL AMPLIFIER AND TWO-WAY OPTICAL TRANSMISSION APPARATUS APPLIED THEREWITH

BACKGROUND OF THE INVENTION

1. Field of the Invention

The present invention relates to a light source with a WDM function applied to an optical communications device and an optical information processing device. The present invention also relates to an optical amplifier and a two-way optical transmission apparatus.

2. Description of the Related Art

An optical repeater for amplifying a signal light attenuated in a transmission line fiber is used in a long-distance fiber communications system. As an optical repeater, an optical fiber amplifier for directly amplifying a rare earth doped optical fiber as a gain media is well known.

In the optical fiber amplifier, it is necessary to lead with a signal light a pump light to a rare earth doped optical fiber for use in an optical amplifying operation by exciting a rare earth doped optical fiber. To attain this, the optical fiber amplifier should be designed to include a wavelength division multiplexer (WDM coupler) for division-multiplexing the signal light and the pump light.

That is, the conventional optical fiber amplifier includes a pump light source for outputting a pump light; a WDM coupler for division-multiplexing a pump light and a signal light and leading the resultant light to a rare earth doped optical fiber; and a rare earth doped optical fiber, that is, a gain media. A WDM coupler can be an optical fiber fused coupler and an optical filter made of a dielectric multi-layered film.

In the conventional optical fiber amplifier, the optical coupler for coupling a pump light source with an optical fiber and a WDM coupler are arranged after being inserted into the optical path from the pump light source to a rare earth doped optical fiber. Therefore, the output of the pump light source is attenuated by the optical coupler and the WDM coupler. As a result, the pump light power input to the rare earth doped optical fiber is reduced. This causes the problem that the gain of the signal light in the rare earth doped optical fiber is undesirably reduced.

SUMMARY OF THE INVENTION

The light source with WDM function and the optical amplifier according to the present invention aim at reducing the loss generated in the process from the pump light to the rare earth doped optical fiber so that the reduction of the gain of the rare earth doped optical fiber can be prevented. Another object of the present invention is to produce a small optical amplifier.

The light source with a WDM function according to the present invention includes a light source for outputting a light having the first wavelength; the first lens for converting the light having the first wavelength into a collimated beam; an optical output unit for outputting a light having the second wavelength; the second lens for converting the light having the second wavelength into a collimated beam; and an optical filter, provided between the first lens and the second lens, for passing the light having the first wavelength and reflecting the light having the second wavelength. The light having the first wavelength and the light having the second wavelength collected by the second lens are input to the optical input unit. Through the optical input unit, a light obtained by wavelength-multiplexing the light having the first wavelength and the light having the second wavelength is output.

The light having the first wavelength output from a light source is converted into a collimated beam and passes through an optical filter. Then, the light is collected by the second lens and coupled to the optical input unit. On the other hand, the light having the second wavelength output from the optical output unit is converted into a collimated beam by the second lens and reflected by the optical filter, and then collected again by the second lens and input to the optical input unit.

At this time, the focal point of the light having the first wavelength is made to match that of the light having the second wavelength by adjusting the incident angle of the light having the second wavelength to an optical filter plate so that the lights can be coupled in the optical input unit. Thus, the lights can be wavelength-multiplexed, and be externally output through the optical input unit.

The optical filter includes a dielectric multi-layered film formed on a substructure passing a light. The first surface of the first lens facing the second lens and the second surface of the second lens facing the first lens are flat, and an optical filter is provided at the first surface or the second surface.

The second lens can be a grated refractive index rod lens. At least the surface of the first lens on the side of the light source is convex, and the second surface of the second lens facing the first lens is flat, and an optical filter is provided at the second surface.

The first wavelength is 1480 nm band and the second wavelength is 1550 nm band, or the first wavelength is 980 nm band and the second wavelength is 1550 nm band. Otherwise, the first wavelength is 1016 nm band and the second wavelength is 1300 nm band.

The optical amplifier according to the present invention includes the above described light source with a WDM function, and the rare earth doped optical fiber connected to the optical input unit of the apparatus. In the configuration of the optical fiber amplifier, the optical input can be designed such that the light having the first wavelength collected by the second lens can be coupled with the light having the second wavelength on the surface of the rare earth doped optical fiber.

In the above described optical amplifier, when the first wavelength of the light source with a WDM function is 1480 nm band while the second wavelength is 1550 nm band, or when the first wavelength is 980 nm band and the second wavelength is 1550 nm band, an erbium doped optical fiber can be used as the rare earth doped optical fiber. On the other hand, when the first wavelength is 1016 nm band and the second wavelength is 1300 nm band, a praseodymium doped fiber is used.

The light source with a WDM function according to the present invention can be designed using a plurality of the above described light sources with a WDM function. That is, the light source includes the first light source device for outputting a light obtained by wavelength-multiplexing the light having the first wavelength $\lambda 1$ and the light having the second wavelength $\lambda 2$; and the second light source device, whose optical output unit is connected to the optical input unit of the first light source device, for outputting a new light obtained by wavelength-mulitplexing the above described wavelength-multiplexed light with the light having the third wavelength $\lambda 3$. The wavelength-multiplexed light containing the wavelengths. A wavelength-multiplexed light having the first wavelength $\lambda 1$ and the second wavelength $\lambda 2$ and a wavelength-multiplexed light having the wavelength $\lambda 3$ are output through the optical input unit of the second light source device.

Furthermore, a two-way optical transmission apparatus can be designed by using the above described light source devices. That is, there are provided a first optical transmission/reception device including the first light source device for outputting the light having the first wavelength $\lambda 1$ and receiving the light having the second wavelength $\lambda 2$ through the optical input unit, and the first receiving optics, connected to the optical output unit of the first light source device, for receiving the light having the second wavelength $\lambda 2$ and converting the light with the second wave length $\lambda 2$ into an electric signal; and a second optical transmission/reception device which has the same configuration as the first optical transmission/reception device, but has inverted wavelengths. The both devices are connected to each other through a transmission line optical fiber.

BRIEF DESCRIPTION OF THE DRAWINGS

The above and other objects, features, and advantages of the present invention will become more apparent from the following detailed description when taken in conjunction with the accompanying drawings, wherein.

DESCRIPTION OF THE PREFERRED EMBODIMENTS

Next, the configurations of the light source with a WDM function, and the optical amplifier and the two-way optical transmission apparatus applied therewith according to the present invention are described below in detail by referring to the attached drawings.

Figure 1:
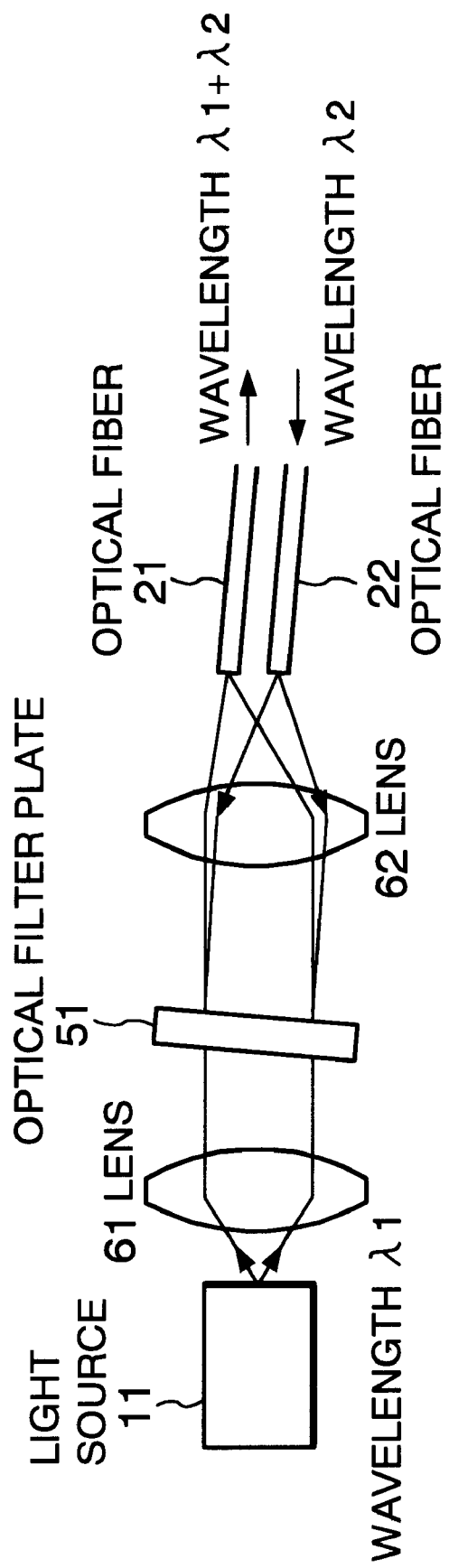
FIG. 1 shows the configuration according to the first embodiment of the light source with a WDM function according to the present invention.

FIG. 1 shows the configuration according to the first embodiment of the light source with a WDM function according to the present invention. The light having the first wavelength $\lambda 1$ output from a light source 11 is converted into a collimated beam by the first lens, and passes through an optical filter plate 51. Then, it is collected by a second lens 62 and coupled with a first optical fiber 21 for input.

On the other hand, a light having the wavelength $\lambda 2$ is input from a second optical fiber 22 provided adjacently and in parallel to the first optical fiber 21, converted into a collimated beam by the second lens 62, and input to the optical filter plate 51. The light having the wavelength $\lambda 2$ is reflected by the optical filter plate 51, input again to the second lens 62, and collected and input to the first optical fiber 21. Through the reciprocity of optics, the light having the wavelength $\lambda 2$ is input from the first optical fiber 21, and then can be output to an optical fiber 22.

With the above described configuration according to the present invention, a semiconductor laser is used for the light source 11, and a single mode fiber is used for the first and second optical fibers 21 and 22. The optical filter plate 51 is made of a multi-layered film filter obtained by coating a glass substructure with a dielectric multi-layered film. For stability of the oscillating operation of the semiconductor laser of the light source 11, an optical isolator can be provided between a lens 61 and the optical filter plate 51 so that a reflected light cannot be returned to the semiconductor laser.

Described below is the second embodiment of the light source with a WDM function according to the present invention.

Figure 2:
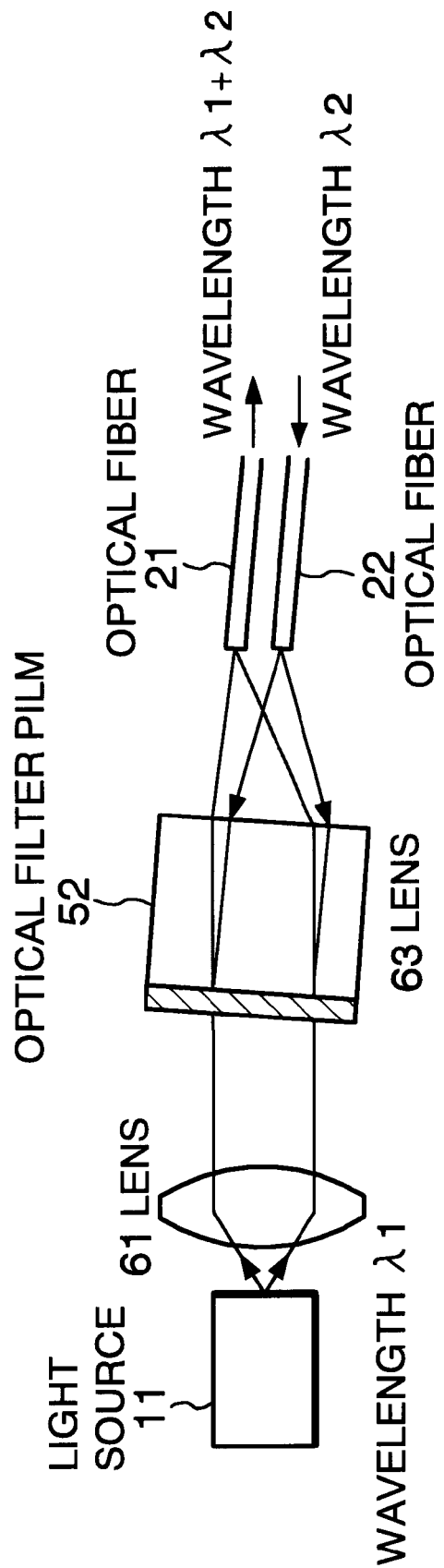
FIG. 2 shows the configuration according to the second embodiment of the light source with a WDM function according to the present invention.

FIG. 2 shows the configuration according to the second embodiment of the present invention. A cylindrical lens is used as the second lens 62 in the present embodiment. The cylindrical lens can be a rod lens obtained by processing one surface of the cylindrical lens as a convex surface and the other surface as a flat surface. With this lens, an optical filter plate using the above described glass substructure can be applied, or an optical filter film 52 can be formed directly on the surface of the lens.

According to the present embodiment of the present invention, a grated refractive index rod lens, which is a cylindrical lens whose refractive index is radially lowered from the center to the side of the cylinder, can be used as a second lens 63.

Described, next is an embodiment of the wavelength-multiplexed light source comprising the above described light source with a WDM function.

Figure 3:
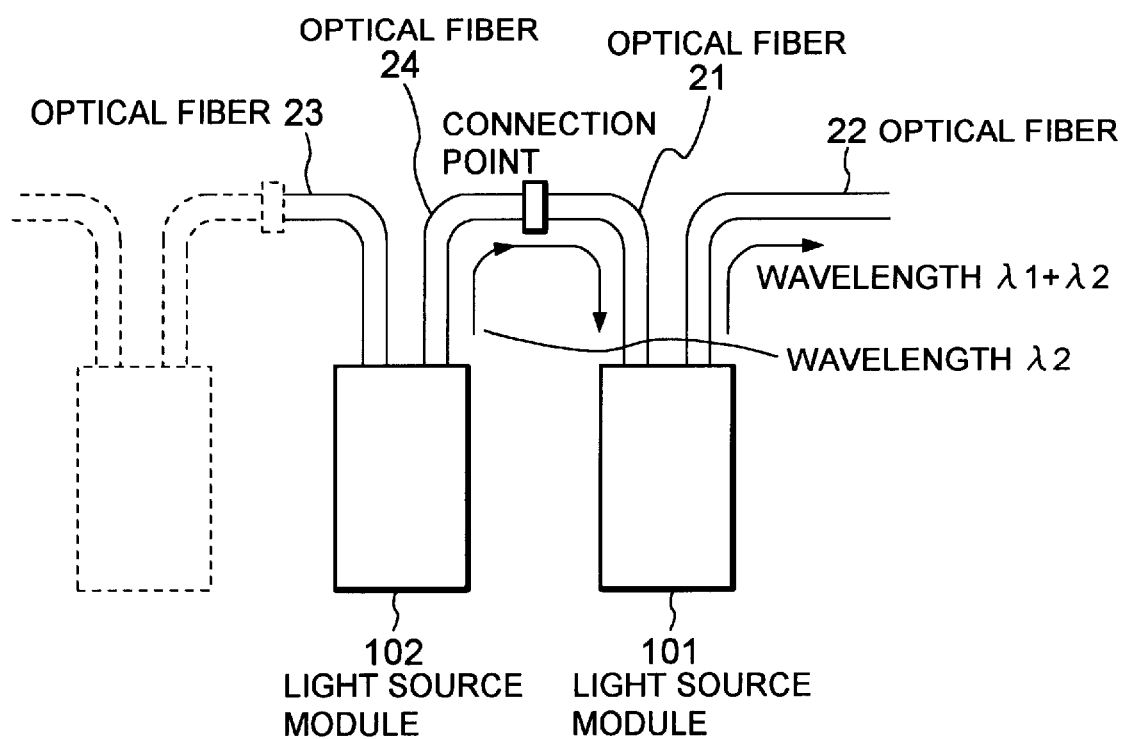
FIG. 3 shows the configuration according to the third embodiment of the light source with a WDM function according to the present invention.

FIG. 3 shows the configuration according to the third embodiment of the light source with a WDM function according to the present invention. The light source device according to the present embodiment can wavelength-multiplex a plurality of lights having respective wavelengths output from a plurality of light sources and output the wavelength-multiplexed light by arranging in series the above described light sources with a WDM function.

With the configuration shown in FIG. 3, the first wavelength of a second light source device 102 is $\lambda 2$, and the second wavelength is $\lambda 1$. Optical fibers 23 and 24 correspond to the first optical fiber and the second optical fiber respectively.

The light having the wavelength $\lambda 2$ output from the second optical fiber 24 of the second light source device 102 is input to a first light source device 101 through the optical fiber 21. A light obtained by wavelength-multiplexing the light having the wavelength $\lambda 1$ and the light having the wavelength $\lambda 2$ is output from the optical fiber 22 of the first light source device 101. Thus, a wavelength-multiplexed light source can be realized using the light source device according to the present invention.

Similarly, the number of multiplexing stages of light sources can be sequentially increased by serially connecting a plurality of light sources of the present invention. That is, the number of wavelength-multiplexing stages of lights output from the first optical fiber of the first-stage light source device can be increased by sequentially connecting the first optical fiber of the second light source device to the second optical fiber of the (n-l)th light source device.

The above described wavelength-multiplexed light source according to the light source device according to the present invention has the feature that the light source can be sequentially added during the operation. That is, since the first-stage light source device connected to a transmission line fiber can be followed by successively connected light source devices, a new light source device can be additionally connected to the last-stage light source device during the operation of the light source devices already connected to the transmission line fiber without stopping the operation of the light source devices.

Described below is an embodiment of the optical fiber amplifier comprising the light source with a WDM function according to the present invention.

Figure 4:
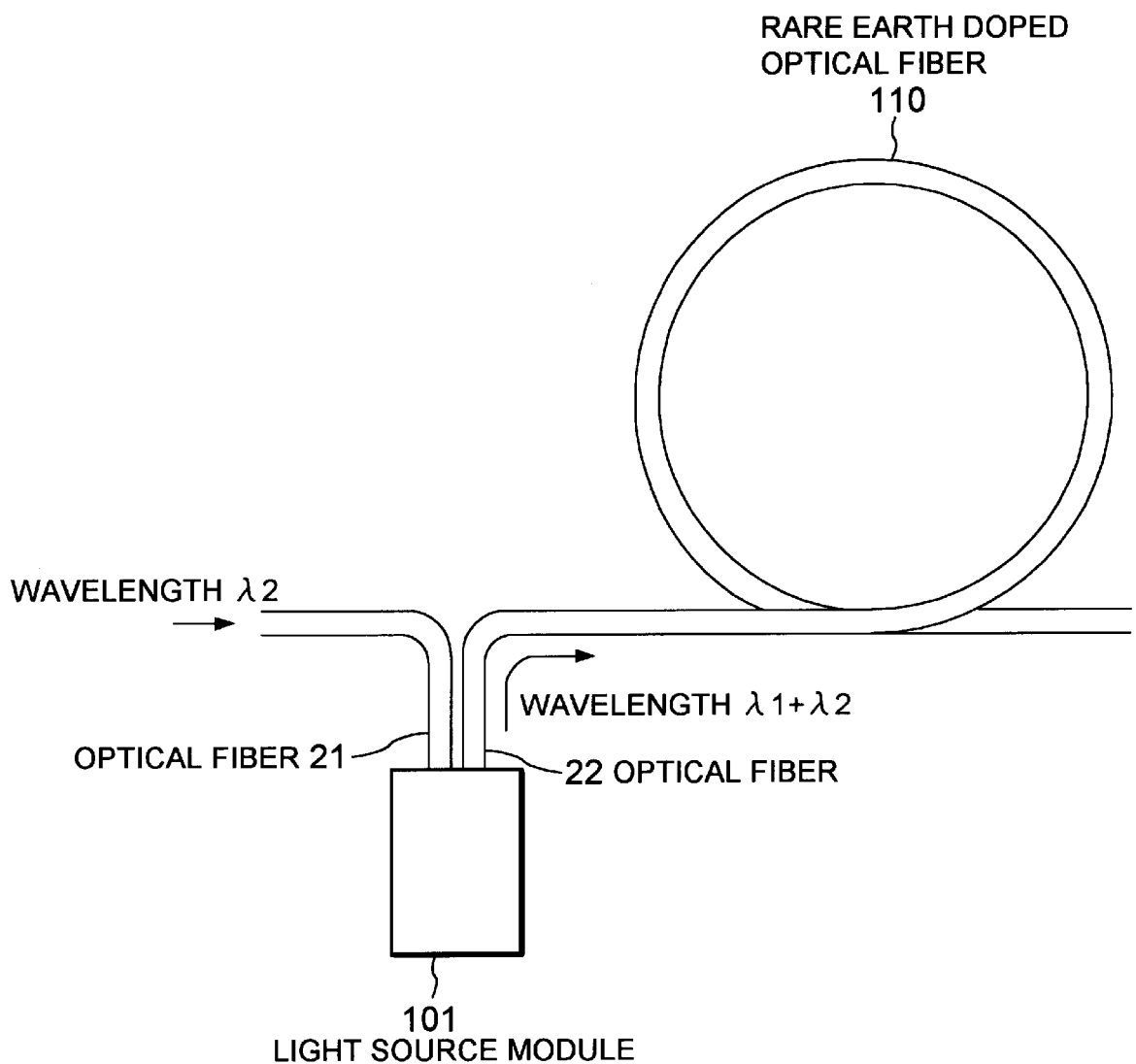
FIG. 4 shows the configuration according to the first embodiment of the optical amplifier of the present invention.
Figure 5:
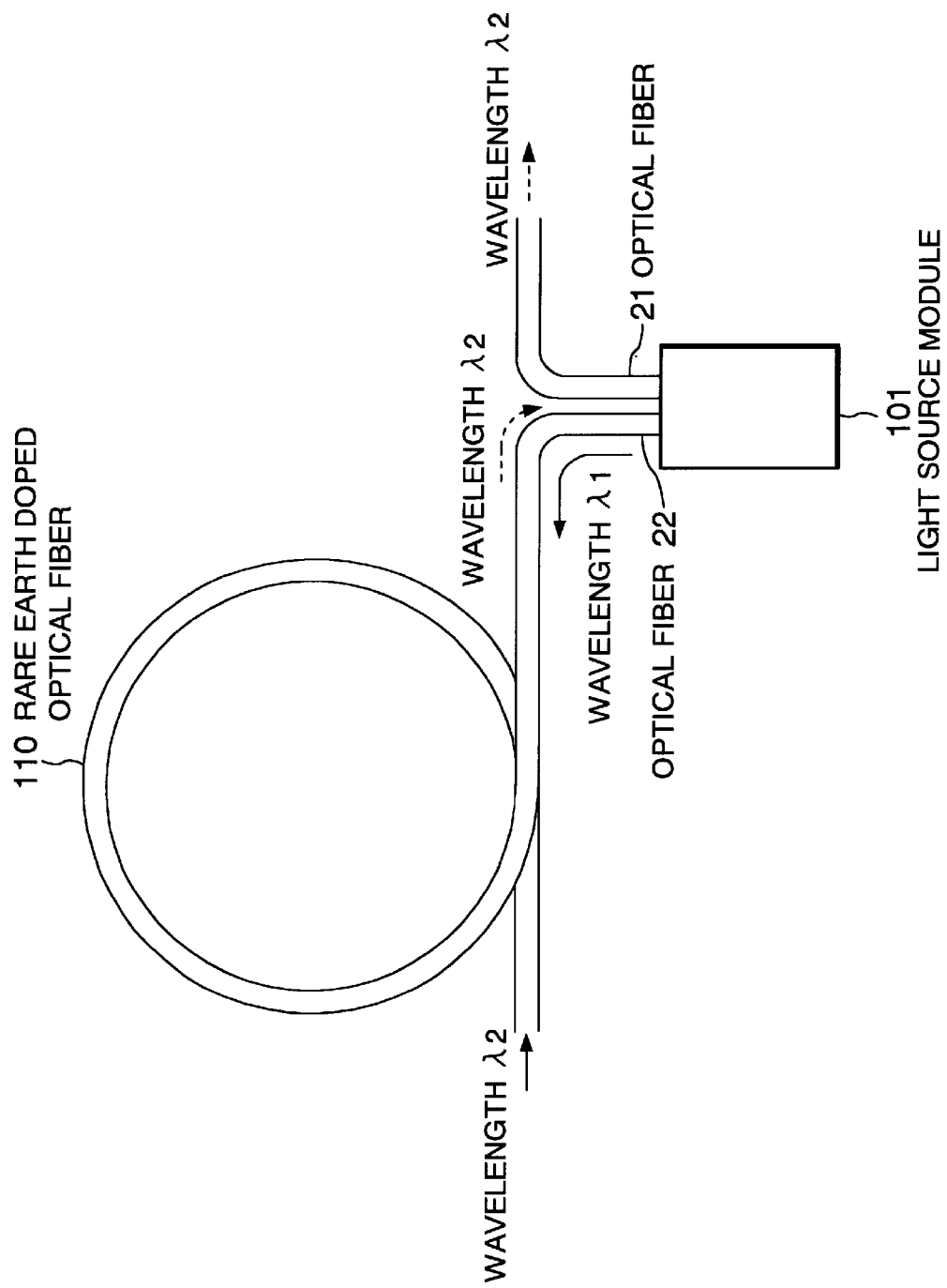
FIG. 5 shows the configuration according to the second embodiment of the optical amplifier of the present invention.

FIGS. 4 and 5 show the configuration according to an embodiment of the optical fiber amplifier comprising the light source with a WDM function of the present invention. FIG. 4 shows the configuration of the optical amplifier with a forward pumping source provided at the stage before a rare earth doped optical fiber 110 which is an amplifying optical fiber. FIG. 5 shows the configuration of the optical fiber amplifier with a backward pumping source provided at the stage after the optical fiber.

For example, the optical amplifier comprising the light source device according to the present invention is described below by referring to FIG. 4. One end of the rare earth doped optical fiber 110, which is excited by the light having the wavelength $\lambda 1$ and amplifies an input signal light having the wavelength $\lambda 2$, is connected to the optical fiber 22. In this example, the light source 11 in the light source device 101 functions as a pump light source for exciting the rare earth ion of the rare earth doped optical fiber 110.

A typical rare earth doped optical fiber 110 is an erbium (Er) doped optical fiber. In this case, a semiconductor laser for outputting a light of 1480 nm band can be used as the light source 11 in the light source device 101. Therefore, in this case, the wavelength $\lambda 1$ in the above explanation belongs to the 1480 nm band.

When an erbium doped optical fiber is used, the wavelength $\lambda 2$ of the signal light input from the optical fiber 21 belongs to 1550 nm band, that is, the amplifying wavelength band of the erbium doped optical fiber. The light of 1550 nm band ($\lambda 2$) input from the optical fiber 21 is wavelength-multiplexed in the light source device 101 with the light of 1480 nm band ($\lambda 1$) output from the light source 11 in the light source device 101. These lights are output from the optical fiber 22 and input to the rare earth doped optical fiber 110. The Er of the rare earth doped optical fiber 110 is excited by the light of 1480 nm band, and the light of 1550 nm band is amplified. The amplified signal light is output from the other end of the rare earth doped optical fiber 110.

According to the present embodiment, the WDM coupler which has been required in the conventional optical fiber amplifier between the light source device and the rare earth doped optical fiber is not necessary. Therefore, the output light from a pump light source can be efficiently led to the rare earth doped optical fiber to maintain a high amplification gain of the rare earth doped optical fiber. That is, the problem with the conventional technology that the WDM coupler is inserted and reduces the gain of the rare earth doped optical fiber can be avoided. Since the WDM coupler is not required, the entire optical system can be very small.

According to the above described embodiment, the wavelength of the pump light source when the erbium doped optical fiber is used is 1480 nm. However, it is obvious that a pump light having the wavelength of 980 nm can also be used.

The configuration shown in FIG. 5 refers to an optical fiber amplifier with backward pumping source. It is different from the one with a forward pumping source in that the light having the wavelength $\lambda 2$ is input from the optical fiber 22 to the light source device 101 through the rare earth doped optical fiber 110. The light having the wavelength $\lambda 2$ amplified by the rare earth doped optical fiber 110 is input from the optical fiber 22 to the light source device 101, and then output from the optical fiber 21.

In each of the above described embodiments, the optical amplifier can be used to amplify lights having different wavelength bands. For example, a praseodymium (Pr) doped fiber can be used as the rare earth doped optical fiber 110 with the wavelengths $\lambda 1$ and $\lambda 2$ respectively set to 1016 nm band and 1300 nm band.

Normally, a praseodymium doped optical fiber is formed using fluoride as host glass. Therefore, it is difficult to fuse and connect the quartz normally used for a transmission line fiber to the praseodymium doped optical fiber. Therefore, the transmission line fiber can be connected to the praseodymium doped optical fiber by mechanically connecting the optical fibers using a connector, etc., or by coupling them through a lens. As a result, the problems that a mechanical loss arises, the entire size cannot be reduced, etc. newly occur.

On the other hand, according to the construction of the present invention, the praseodymium doped optical fiber can be used as the optical fiber 21 of the light source device, thereby eliminating the above described problems.

Figure 6:
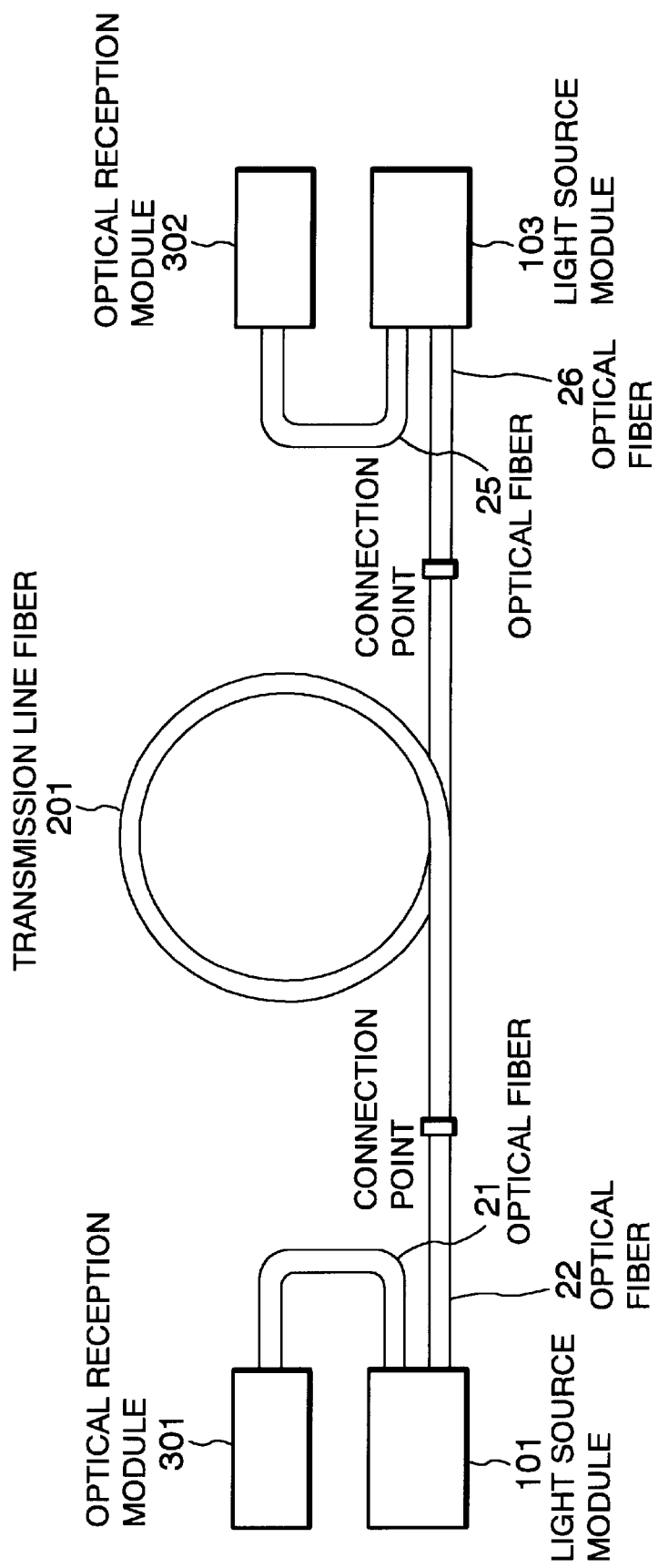
FIG. 6 shows the configuration according to an embodiment of the two-way optical transmission device of the present invention.

A two-way optical transmission apparatus can also be designed by using the light source device according to the present invention. FIG. 6 shows the configuration according to an embodiment of the two-way optical transmission apparatus of the present invention.

As shown in FIG. 6, the light source device 101 and a light source device 103 are connected to each other through a transmission line fiber 201. Optical reception devices 301 and 302 are connected to the respective light source devices.

The first and second wavelengths of the light source device 101 are $\lambda 1$ and $\lambda 2$ respectively. The first and second wavelengths of the light source device 103 are $\lambda 2$ and $\lambda 1$ respectively. The light having the wavelength output from the first optical fiber 22 of the light source device 101 is input to a first optical fiber 26 of the light source device 103 through the transmission line fiber 201, output from a second optical fiber 25 of the light source device 103, and then input to and received by the optical reception device 302. On the other hand, the light having the wavelength $\lambda 2$ output from the first optical fiber 26 of the light source device 103 is input to the first optical fiber 22 of the light source device 101 through the transmission line fiber 201, output from the second optical fiber 21 of the light source device 101, and then received by the optical reception device 301. In the present embodiment, for example, wavelengths $\lambda 1$ and $\lambda 2$ can be respectively assigned the lights of 1300 nm and 1550 nm for two-way wavelength-multiplexed light transmission. The receiving optics such as photo diode, avalanche diodle, etc. can be applied to the optical reception devices 301 and 302.

The two-way optical transmission apparatus using the light source device according to the present invention as shown in FIG. 6 does not require a WDM coupler for demultiplexing a wavelength on the transmission/reception side. As a result, a two-way optical transmission system without a large excessive loss can be realized. In addition, the entire system can be smaller on the transmission/reception side. The light source device described above by referring to the first through third embodiment can be used.

The light source with a WDM function according to the present invention has the function of outputting a light obtained by wavelength-multiplexing the light output from a light source element with the light input from an external device. Therefore, a small and high gain optical fiber amplifier can be realized by connecting a rare earth doped optical fiber to the light source device according to the present invention.

A wavelength-multiplexed light source can be designed by serially connecting plural stages of light source devices according to the present invention. A wavelength-multiplexed optical fiber amplifier can also be realized according to the present invention. At this time, light source devices of new wavelengths can be sequentially connected to the current last stage of the light source device. Therefore, they can be added without stopping the operations of the optical fiber amplifier, etc. Furthermore, the two-way optical transmission apparatus can also be realized by connecting the light source device and the optical reception device to both ends of the transmission line fiber.

While this invention has been described in connection with certain preferred embodiments, it is to be understood that the subject matter encompassed by way of this invention is not to be limited to those specific embodiments. On the contrary, it is intended for the subject matter of the invention to include all alternative, modification, and equivalents as can be included within the spirit and scope of the following claims.

What is claimed is:

1. A two-way optical transmission apparatus, comprising:
   a first light source device; and
   a second light source device,
   wherein said first light source device comprises:
      a first light source for outputting a light having a first wavelength;
      a first lens for converting the light having the first wavelength into a collimated beam;
      a first optical input/output terminal for receiving the light having the first wavelength and outputting a light having a second wavelength;
      a second lens for converting the light having the second wavelength into a collimated beam;
      a first optical filter, provided between said first lens and said second lens, for passing the light having the first wavelength, and reflecting the light having the second wavelength; and
      a first optical input terminal for receiving the light having the second wavelength,
   wherein said second light source device comprises:
      a second light source for outputting a light having a second wavelength;
      a third lens for converting the light having the second wavelength into a collimated beam;
      a second optical input/output terminal for receiving the light having the second wavelength and outputting a light having the first wavelength;
      a fourth lens for converting the light having the first wavelength into a collimated beam;
      a second optical filter, provided between said third lens and said fourth lens, for passing the light having the second wavelength, and reflecting the light having the first wavelength, and
      a second optical input terminal for receiving the light having the first wavelength; and
   said two-way optical transmission apparatus further comprises:
      a first receiving optics, connected to said first optical input terminal of said first light source device, for receiving and converting the light having the second wavelength into an electrical signal;
      a second receiving optics, connected to said second optical input terminal of said second light source device, for receiving and converting the light having the first wavelength into an electrical signal; and
      a transmission line optical fiber for connecting said first optical input/output terminal of said first optical transmission/reception device to said second optical input/output terminal of said second optical transmission/reception device,
   wherein said transmission line optical fiber comprises a rare earth doped optical fiber, and
   wherein said first optical input terminal couples said light having the first wavelength collected by said second lens with said light having the second wavelength on a surface of said rare earth doped optical fiber.

2. The two-way optical transmission apparatus according to claim 1, wherein said rare earth doped optical fiber contains erbium.

3. The two-way optical transmission apparatus according to claim 2, wherein said first wavelength is 1480 nm band, and said second wavelength is 1550 nm band.

4. The two-way optical transmission apparatus according to claim 2, wherein said first wavelength is 980 nm band, and said second wavelength is 1550 nm band.

5. The two-way optical transmission apparatus according to claim 1, wherein said rare earth doped optical fiber contains praseodymium.

6. The two-way optical transmission apparatus according to claim 5, wherein said first wavelength is 1016 nm band, and said second wavelength is 1300 nm band.

7. The two-way optical transmission apparatus, as claimed in claim 1, wherein said rare earth doped optical fiber is directly coupled to said first and second optical input units for receiving light directly from said first and second light sources.

* * * * *